(12) United States Patent
Kajita et al.

(10) Patent No.: US 9,227,614 B2
(45) Date of Patent: Jan. 5, 2016

(54) CHECK VALVE AND BRAKING SYSTEM USING THE SAME

(71) Applicants: DENSO CORPORATION, Kariya, Aichi-pref. (JP); Advics Co., Ltd., Kariya, Aichi-pref. (JP)

(72) Inventors: Hidenobu Kajita, Obu (JP); Masaaki Omi, Anjo (JP)

(73) Assignees: DENSO CORPORATION, Kariya (JP); ADVICS CO., LTD., Kariya (JP)

( * ) Notice: Subject to any disclaimer, the term of this patent is extended or adjusted under 35 U.S.C. 154(b) by 128 days.

(21) Appl. No.: 13/754,034

(22) Filed: Jan. 30, 2013

(65) Prior Publication Data

US 2013/0193748 A1    Aug. 1, 2013

(30) Foreign Application Priority Data

Jan. 31, 2012  (JP) .................................. 2012-018433

(51) Int. Cl.
| | |
|---|---|
| *F16K 15/02* | (2006.01) |
| *B60T 17/04* | (2006.01) |
| *B60T 13/14* | (2006.01) |
| *B60T 8/34* | (2006.01) |
| *B60T 8/48* | (2006.01) |
| *F16K 15/04* | (2006.01) |
| *F16K 27/02* | (2006.01) |

(52) U.S. Cl.
CPC ................. *B60T 17/04* (2013.01); *B60T 8/341* (2013.01); *B60T 8/4872* (2013.01); *B60T 13/143* (2013.01); *F16K 15/044* (2013.01); *F16K 27/0209* (2013.01); *Y10T 137/7931* (2015.04)

(58) Field of Classification Search
CPC .............. F16K 15/044; F16K 17/0406; F16K 17/0466; B60T 8/306; B60T 8/4283; B60T 11/30; B60T 8/30; B60T 8/303
USPC .................... 303/10; 137/514.5, 514.7, 539.5
See application file for complete search history.

(56) References Cited

U.S. PATENT DOCUMENTS

| | | | | |
|---|---|---|---|---|
| 1,931,938 | A | * 10/1933 | Pippin ......................... | 137/539.5 |
| 2,481,713 | A | *  9/1949 | Bertea ......................... | 137/515.5 |
| 2,945,508 | A | *  7/1960 | Schweisthal .................. | 137/515 |

(Continued)

FOREIGN PATENT DOCUMENTS

| | | | |
|---|---|---|---|
| CN | 1436687 | 8/2003 | |
| DE | 2213104 A1 | * 10/1972 | .............. F04B 53/10 |

(Continued)

OTHER PUBLICATIONS

Office Action dated Jul. 21, 2014 in corresponding Chinese Application No. 201310038672.7.

(Continued)

*Primary Examiner* — Bradley King
*Assistant Examiner* — Stephen Bowes
(74) *Attorney, Agent, or Firm* — Harness, Dickey & Pierce, P.L.C.

(57) ABSTRACT

In a check valve in which a valve part is disposed in a valve part accommodating recess movably relative to a piston part, among the valve part accommodating recess, an anti-valve seat side accommodation space formed between a surface of the valve part accommodating recess in an anti-valve seat side of the valve part and a wall surface of the valve part accommodating recess are communicated to exit side fluid passages.

2 Claims, 5 Drawing Sheets

(56) References Cited

U.S. PATENT DOCUMENTS

| | | | | |
|---|---|---|---|---|
| 3,559,678 | A | * | 2/1971 | Donner .................. 137/535 |
| 3,799,194 | A | * | 3/1974 | Bedo et al. ................ 137/539.5 |
| 4,706,705 | A | | 11/1987 | Lee, II |
| 5,065,790 | A | * | 11/1991 | Kornas ...................... 137/514.5 |
| 5,141,025 | A | * | 8/1992 | Eichhorn et al. ........... 137/539.5 |
| 6,283,094 | B1 | * | 9/2001 | Ogata ........................ 123/467 |
| 6,892,758 | B2 | * | 5/2005 | Inage et al. ................ 137/539.5 |
| 7,543,896 | B2 | * | 6/2009 | Ariki et al. ................. 303/115.4 |
| 2003/0146659 | A1 | | 8/2003 | Cheong |
| 2007/0023087 | A1 | | 2/2007 | Krebs et al. |
| 2013/0192697 | A1 | * | 8/2013 | Kajita et al. ................ 137/514 |

FOREIGN PATENT DOCUMENTS

| | | | | |
|---|---|---|---|---|
| DE | 19604889 | A1 * | 8/1997 | ............. F16K 17/04 |
| FR | 2553490 | A1 * | 4/1985 | ............. F16K 17/04 |
| GB | 851904 | A * | 10/1960 | ............. F16K 17/04 |
| GB | 2086543 | A * | 5/1982 | ............. F16K 31/00 |
| JP | 61130676 | A * | 6/1986 | ............. F16K 17/04 |
| JP | 03-069873 | | 3/1991 | |
| JP | 09-020218 | | 1/1997 | |
| JP | 2002-295698 | | 10/2002 | |
| JP | 2003-226233 | | 8/2003 | |
| JP | 2007-298183 | | 11/2007 | |

OTHER PUBLICATIONS

Office Action dated Jun. 3, 2014 in corresponding Japanese Application No. 2012-018433.

* cited by examiner

CHECK VALVE AND BRAKING SYSTEM USING THE SAME

CROSS-REFERENCE TO RELATED APPLICATION

This application is based on and claims the benefit of priority from earlier Japanese Patent Application No. 2012-18433 filed Jan. 31, 2012, the description of which is incorporated herein by reference.

TECHNICAL FIELD

The present disclosure relates to a check valve that permits fluid to flow only in one-way and a braking system that uses the check valve.

BACKGROUND

A conventional check valve has a case where a fluid passage and a valve seat are formed, a valve member that touches and separates from the valve seat to open and close the fluid passage, and a spring that energizes the valve member in a valve-closing direction.

Further, the check valve is opened when an energization force of fluid in a valve opening direction exceeds an energization force of the spring in a valve closing direction.

Moreover, the valve member has a piston part that reciprocates and a valve part that touches to and separates from the valve seat. The piston part and the valve part are unified, and the piston part is accommodated in the case reciprocatably (refer to Japanese Patent Application Laid-Open Publication No.9-20218, for example), A braking system that controls a brake fluid pressure of a ABS control (anti-skid control) of a vehicle has a brake fluid pressure generating means that generates the brake fluid pressure based on an operation of a braking member, and a pump that pumps the brake fluid from a low pressure area and discharges the high-pressurized brake fluid.

The conventional check valve mentioned above is used, for example, as a discharge valve of the pump in the braking system.

In that case, the check valve is disposed between the brake fluid pressure generating means and the discharge side of the pump, and permits the flow from the pump to the brake fluid pressure generating means when the pump is operating, while a braking pressure of a regular braking system is prevented from falling out to the low pressure area through the pump during a regular braking when pump is not operating.

However, in the conventional check valve, if the piston part sticks within the case due to a foreign substance when the valve is opened, since the valve part cannot sit onto the valve seat (i.e., the valve is not closed) even if the pressure in the lower stream side of the fluid flow becomes higher than the pressure in the upper stream side of the fluid flow, there is a problem that fluid would flow backwards.

Moreover, if the piston part gets stuck and does not close the valve as mentioned above when the conventional check valve is used as a discharge valve of the pump in the braking system, since the braking pressure of regular so braking system reduces to the pressure of the low pressure area through the pump during regular braking, there is a problem that the brakes during regular braking became weak.

SUMMARY OF THE DISCLOSURE

An embodiment provides a check valve that enables to close the valve even if a piston part sticks.

The embodiment also provides the check valve that prevents brakes from getting weak during a regular braking even if the piston part of the check valve sticks when the lo check valve is used as a discharge valve of a pump in a braking system.

In a check valve according to a first aspect, the check valve includes a case member that has an entrance-side fluid passage where fluid flows in, an exit-side fluid passage where fluid flows out, and a valve seat disposed in a downstream end of the entrance-side fluid passage, a valve member that opens and closes a passage between the entrance-side fluid passage and the exit-side fluid passages by touching to and separating from the valve seat, and is energized in a valve opening direction by a pressure of the fluid from the entrance-side fluid passage, and a spring that energizes the valve member in a valve closing direction.

The check valve opens when the energization force in the valve opening direction due to the pressure exceeds the energization force in the valve closing direction due to the spring.

The valve member has a piston part that reciprocates, and a valve part that is disposed in the valve seat side and touches and separates to the valve seat, the case member has a piston accommodation cylinder part that accommodates the piston part reciprocatably, and the piston part has a valve part accommodating recess that accommodates a part of the valve part.

The valve part is disposed in the valve part accommodating recess movably relative to the piston part, and is urged against a wall surface of the valve part accommodating recess by a pressure of the fluid from the entrance-side fluid passage, and among the valve part accommodating recess, an anti-valve seat side accommodation space formed between a surface in an anti-valve seat side of the valve part and a wall surface of the valve part accommodating recess communicates to the exit side fluid passage.

Accordingly, when the pressure of the exit side fluid passage (i.e., lower stream side of the fluid flow) becomes higher than the pressure of an entrance-side fluid passage (i.e., upper stream side of the fluid flow), since the pressure of the exit side fluid passage is led to the anti-valve seat side accommodation space and the pressure acts on the surface in the anti-valve seat side of the valve part, the valve part moves to the valve seat side by the pressure to close the valve, and this prevents the fluid from flowing backwards even if the piston part sticks when the valve is open.

In the check valve according to a second aspect, there is provided a damper chamber that is farmed by the valve member and the case member in an anti-valve seat side of the valve member, and generates damping force.

The anti-valve seat side accommodation space is communicated to the exit side fluid passage through a piston part communicating hole formed in the piston part that communicates the anti-valve seat side accommodation space and the damper chamber, the damper chamber, and a gap between the piston part and the piston accommodation cylinder part.

In the check valve according to a third aspect, the anti-valve seat side accommodation space is communicated to the exit side fluid passage through a piston part communicating slot formed in the wall surface of the valve part accommodating recess.

In the check valve according to a fourth aspect, the depth of the valve part accommodating recess is configured so that the valve part does not detach from the valve part accommodating recess when the piston part is positioned where most distant from the valve seat.

In the check valve according to a fifth aspect, the valve part accommodating recess has a tapered surface, and the valve part is contactable to the tapered surface.

In a braking system according to a sixth aspect, the braking system includes a brake fluid pressure generating means that generates a brake fluid pressure based on an operation of a braking member, a pump that pressurizes a low-pressure brake fluid and discharges it, and the check valve according to any one of the above aspects.

The check valve is disposed between the brake fluid pressure generating means and a discharging side of the pump, and permits only a flow from the pump to the brake fluid pressure generating means.

Accordingly, when the pressure of the brake fluid pressure generating means side becomes higher than the pressure of the pump side like the time of usual braking during the time the pump is not operating, since the pressure of the exit side fluid passage is led to the anti-valve seat side accommodation space of the check valve and the pressure acts on the surface in the anti-valve seat side of the valve part of the check valve, the valve part moves to the valve seat side due to the pressure to close the valve, and this prevents the brake fluid from flowing backwards even if the piston part of the check valve sticks when the valve is open.

Therefore, even if the piston part sticks when the valve is open, weakening of the brakes during regular braking can be avoided.

DETAILED DESCRIPTION OF THE PREFERRED EMBODIMENTS

Figure 1:
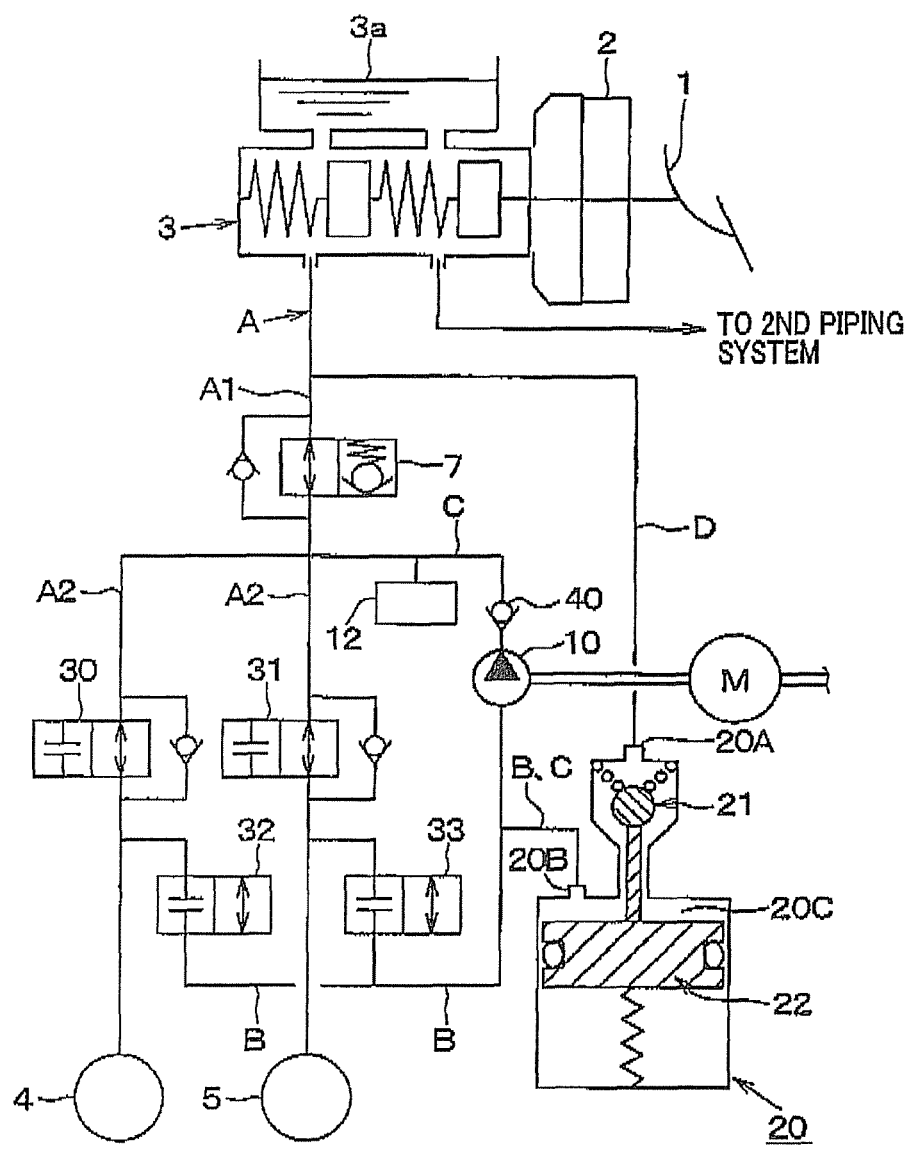
FIG. 1 shows a schematic piping diagram of a braking system for vehicles to which a check valve regarding a first embodiment of the present disclosure is applied.

With reference to the drawings, hereinafter will be described embodiments of the present disclosure.

It should be appreciated that, in the following embodiments, components identical with or similar to those in the embodiments are given the same reference numerals for the sake of omitting explanation.

The First Embodiment

With reference to FIG. 1, a basic composition of a braking system for vehicles of the present embodiment is explained.

However, a check valve in FIG. 1 is simplified in this regard and since a characteristic part of the present disclosure is not shown, the characteristic part will be explained with reference to FIG. 2 and FIG. 3 later.

In addition, a case where the braking system in the present embodiment is applied to the vehicles that constitute an X piping hydraulic circuit that has each piping system of a front right wheel—rear left wheel and a front left wheel—rear right wheel is explained here.

As shown in FIG. 1, a brake pedal 1 stepped on by a driver as a braking member when applying a braking effort to the vehicle is connected with a servo unit 2, and a stepping force applied to the brake pedal 1 is boosted by the servo unit 2.

Further, the servo unit 2 has a pushrod etc. that transmits the boosted stepping force to a master cylinder (henceforth M/C) 3, and generates an M/C pressure by press-pushing a master piston disposed in the M/C 3 by the pushrod.

A brake fluid pressure generating means is constituted by the brake pedal 1, the servo unit 2, and the M/C 3.

In addition, a master reservoir 3a that supplies brake fluid into the M/C 3 or stores a surplus brake fluid in the M/C 3 is connected to the M/C 3.

The M/C pressure is transmitted to wheel cylinders (henceforth W/C) 4 and 5 of each wheel, i.e., a wheel braking force generating means, through an ABS actuator.

In addition, although only a first piping system that is connected with the W/C 4 for the front right wheel FR and the W/C S for the rear left wheel RL are shown in FIG. 1, it is considered that a second piping system connected with the front left wheel FL and the rear right wheel RR has the same structure as the first piping system.

The following explanation explains regarding the front right wheel FR and the rear left wheel RL side, however, it is completely the same also regarding the front left wheel FL and the rear right wheel RR that is the second piping system.

Moreover, the braking system has a pipeline (main pipeline) A connected to the M/C 3.

The pipeline A has a differential-pressure-control valve 7, and the pipeline A is divided into two ways at a position of the differential-pressure-control valve 7.

Specifically, the pipeline A is divided into a pipeline A1 that receives the M/C pressure from the M/C 3 to the differential-pressure-control valve 7, and pipelines A2 from the differential-pressure-control valve 7 to each of the W/C 4 and 5.

The differential-pressure-control valve 7 controls a communicating condition and a differential pressure condition.

Although the differential-pressure-control valve 7 is usually kept to a communicated condition, the W/C 4 and 5 sides may be held to higher pressure than the M/C 3 side for predetermined difference pressure by switching the differential-pressure-control valve 7 to the difference pressure condition.

Furthermore, in the pipelines A2, the pipeline A is divided into two ways, and one of openings thereof is provided with a boost controlling valve 30 that controls a boost of the brake fluid pressure of the W/C 4, another one of the openings is provided with another boost controlling valve 31 that controls a boost of the brake fluid pressure of the W/C 5.

These boost controlling valves 30 and 31 are constituted as two-position valves that can control a communication and an interception conditions by an electrical control unit (henceforth ECU, not shown) for the brake fluid pressure control.

Further, when the two-position valve is open, the M/C pressure or the brake fluid pressure based on a discharge of a pump 10 (mentioned later), etc. can be added to each of the W/C 4 and 5.

These boost controlling valves 30 and 31 are always opened during a regular braking period, i.e., the brake fluid pressure control of the ABS control etc. is not performed.

Moreover, pipelines B are connected to the pipelines A between the boost controlling valves 30 and 31, and each of the W/C 4 and 5, and the pipelines B are connected to a reservoir hole 208 of a pressure regulating reservoir 20.

Further, by making the brake fluid flow to the pressure regulating reservoir 20 through the pipelines B, the brake fluid pressure in the W/C 4 and 5 is suppressed, and each wheel can be prevented from locking.

Moreover, decompression controlling valves 32 and 33 that can control the communication and the interception so conditions by the ECU are disposed on the pipelines B.

The decompression controlling valves 32 and 33 are always closed during regular braking period, and when making the brake fluid flow to the pressure regulating reservoir 20, they are suitably opened.

The pipeline C is connected to the pipelines A between the differential-pressure-control valve 7 and the boost controlling valves 30 and 31, and the pipeline A and the reservoir hole 20B of the pressure regulating reservoir 20 are connected through the pipeline C.

The pump 10 and a check valve 40 (details are mentioned later) are disposed on the pipeline C, and in order to ease pulsation of the brake fluid that the pump 10 discharges, an accumulator 12 is disposed at the pipelines C in the downstream of the pump.

Moreover, a pipeline D is formed so as to connect a reservoir hole 20A and the M/C 3.

The pump 10 draws up the brake fluid in the pipeline A1 through the pipeline D and the pressure regulating reservoir 20, and discharges the brake fluid into the pipeline A2 through a part of pipeline B and the pipeline C to increase the W/C pressure.

In addition, the pump 10 is driven when controlling brake assistant, traction, and skid prevention, for example.

The pressure regulating reservoir 20 is built in a housing of the ABS actuator, and the reservoir chamber 20C is formed in the housing.

The reservoir chamber 20C is a chamber that stores the brake fluid flowed through the reservoir holes 20A and 20B, and sends out the brake fluid through the reservoir hole 20B.

A piston 22 is accommodated in the reservoir chamber so 20C and reciprocates therein.

Moreover, the reservoir hole 20A has a valve part 21 that opens and closes the reservoir hole 20A.

Next, the composition of the check valve 40 mentioned above is explained based on FIG. 2, FIG. 3 and FIG. 4.

The check valve 40 is built in the housing 50 of the ABS actuator.

Specifically, the check valve 40 is used as a discharge valve of the pump 10 that pumps up and discharges the brake fluid.

The check valve 40 is disposed between the M/C 3 and the boost controlling valves 30 and 31, and the discharging side of the pump 10, only the flow from the pump 10 to the M/C 3 and the flow from the pump 10 to the boost controlling valves 30 and 31 are permitted, while the flow to an opposite direction is obstructed.

The check valve 40 has a substantially cylindrical first case 41, a closed-bottomed cylindrical second case 42, a spherical valve part 43, a substantially cylindrical piston part 44, and a spring 45.

A valve seat etc. is formed in the first case 41. The second case 42 is fitted to the first case 41. The valve part 43 touches and separates with the valve seat to open and close a passage. The piston part 44 holds the valve part 43. The spring 45 energizes the valve part 43 and the piston part 44 in a valve-closing direction.

The spring 45 is a coil spring in particular in the present embodiment.

In addition, the first case 41 and the second case 42 constitute a case member of the present disclosure, Moreover, the valve part 43 and the piston part 44 constitute a valve member of the present disclosure.

In the following explanation, an axial direction of the first case 41 is simply called to an axial direction.

Moreover, a direction which intersects perpendicularly with the axial direction is simply called a radial direction.

The first case 41 is made of metal, and an entrance-side fluid passage 411 where the brake fluid flows in, a cylindrical piston accommodation cylinder part 414, a through hole 412 in the cylinder part 414 where the brake fluid flows out, a valve seat 413 disposed in a downstream end of the entrance-side fluid passage 411, and a flange part 415 projected outwardly from a perimeter surface in the radial direction are formed.

The second case 42 is press-fit onto an outer surface side of the piston accommodation cylinder part 414.

The flange part 415 is press-fit into the housing 50 of the ABS actuator.

The pipeline C is separated into the downstream side pipeline C of the check valve 40 and the upstream side pipeline C of the check valve 40 by the flange part 415.

The entrance-side fluid passage 411 is positioned in a central part in the radial direction and extended along with the axial direction.

Moreover, an entrance side end of the entrance-side fluid passage 411 is communicated to the upstream side pipeline C of the check valve 40, and the brake fluid discharged from the pump 10 flows in.

A guide hole 416 that is a cylindrical space where the piston part 44 slides is formed to an inner circumference side of the piston accommodation cylinder part 414.

The guide hole 416 is disposed coaxially with the entrance-side fluid passage 411.

Therefore, the piston part 44 reciprocates in the axial direction.

Moreover, the guide hole 416 is located in the downstream side of the valve seat 413, and is divided into an exit-side fluid passage 417 in the cylinder part and a damper chamber 418 by the valve part 43 and the piston part 44.

In the following explanation, a reciprocating direction of the piston part 44 is called a valve member reciprocating direction.

The exit-side fluid passage 417 in the cylinder part 414 is a space between the valve seat 413, the valve part 43, and the piston part 44, and the brake fluid that passed through the entrance-side fluid passage 411 flows in.

The through hole 412 is extended in the radial direction, and only the single through hole 412 is formed in the piston accommodation cylinder part 414.

Further, an outer surface side of the piston accommodation cylinder part 414 and the exit-side fluid passage 417 in the cylinder part 414 are communicated by the through hole 412, and the brake fluid that passes through the exit-side fluid passage 417 in the cylinder part 414 flows into the through hole 412.

Moreover, an exit side end of the through hole 412 is communicated with the pipeline C in the downstream side of the check valve 40.

Therefore, the brake fluid that flows through the exit-side fluid passage 417 in the cylinder part 414 and the through hole 412 without flowing through the damper chamber 418.

In addition, the through hole 412 and the exit-side fluid passage 417 in the cylinder part 414 constitute an exit-side fluid passage of the present disclosure.

The damper chamber 418 is, a substantially sealed space located in an anti-valve seat side of the valve part 43 and the piston part 44, and is formed by the piston accommodation cylinder part 414 of the first case 41, a bottom of the second case 42, the valve part 43, and the piston part 44.

Furthermore, the spring 45 is disposed in the damper chamber 418.

A valve part accommodating recess 441 located in the valve seat 413 side and accommodates a part of the valve part 43 is formed in the piston part 44.

The valve part 43 accommodated in the valve part accommodating recess 441 is held in the state movable relative to the piston part 44.

Moreover, the depth of the valve part accommodating recess 441 is configured so that the valve part 43 does not detach from the valve part accommodating recess 441 when the piston part 44 is positioned where most distant from the valve seat 413.

A side of the valve part accommodating recess 441 near the valve seat 413 forms a cylindrical space (hereinafter, it is called a valve seat side accommodation space 442), and the side far from the valve seat 413 forms a conical space (hereinafter, it is called an anti-valve seat side accommodation space 443).

More specifically, the anti-valve seat side accommodation space 443 is formed between a surface in an anti-valve seat side of the valve part 43 and a conical wall surface of the valve part accommodating recess 441.

A piston part communicating hole 444 that communicates the anti-valve seat side accommodation space 443 and the damper chamber 418, and the spring accommodating recess 445 that accommodates a part of the spring 45 are formed in the anti-valve seat side of the piston part 44.

In addition, the spring accommodating recess 445 constitutes a part of the damper chamber 418.

The anti-valve seat side accommodation space 443 is communicated to the exit-side fluid passage 417 in the cylinder part through the piston part communicating hole 444, the spring accommodating recess 445, the damper chamber 418, and a gap between the piston part 44 and the piston accommodation pipe part 414.

Figure 2:
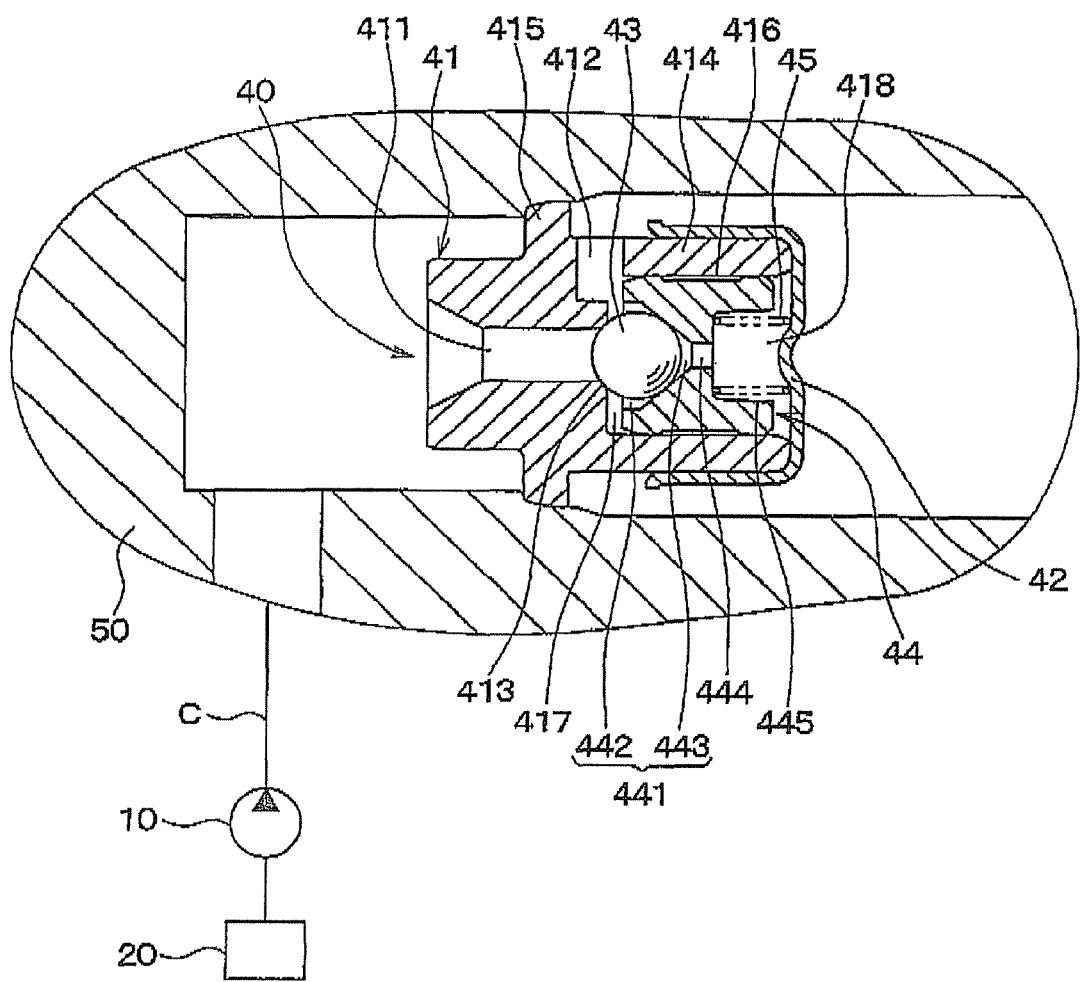
FIG. 2 shows a sectional view of the check valve of FIG. 1 in a closed-valve state.
Figure 3:
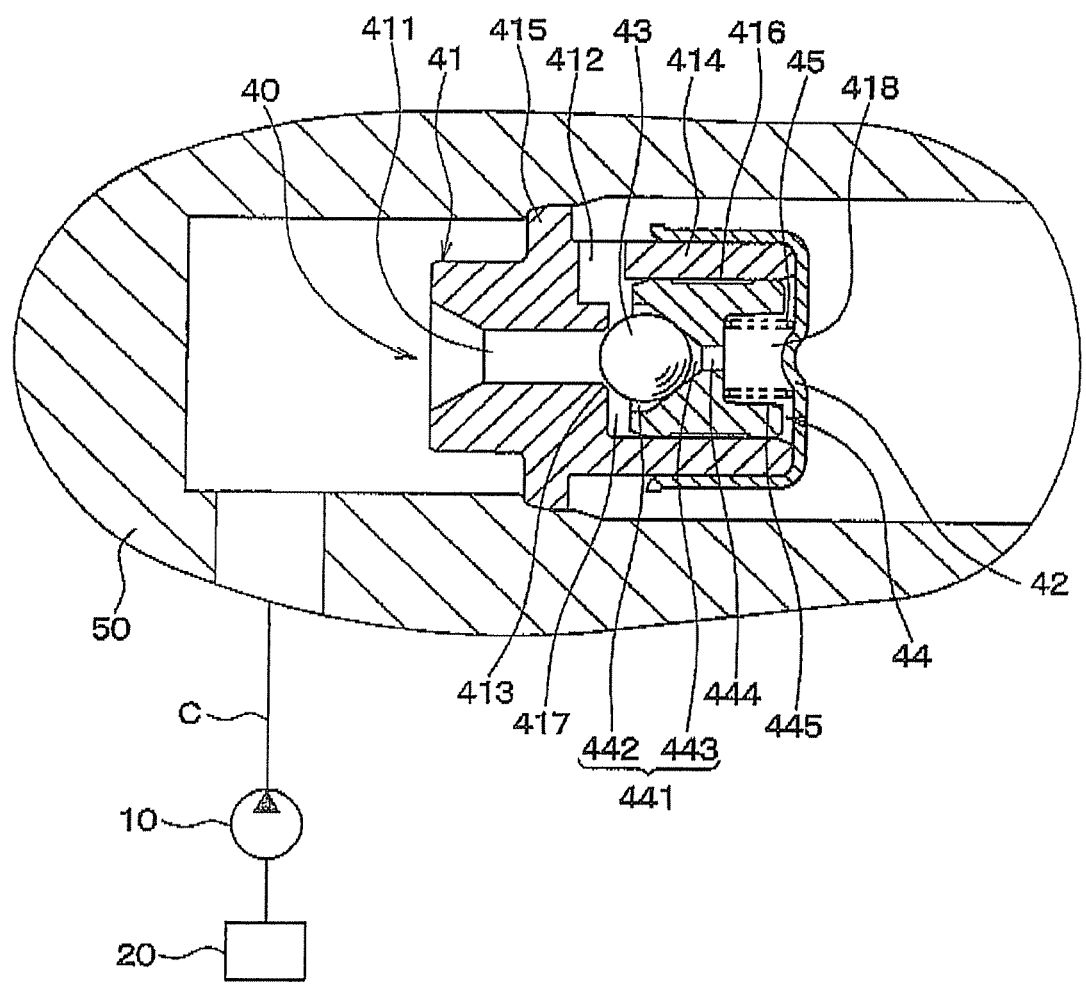
FIG. 3 shows a sectional view of the check valve of FIG. 1 in an opened-valve state.
Figure 4:
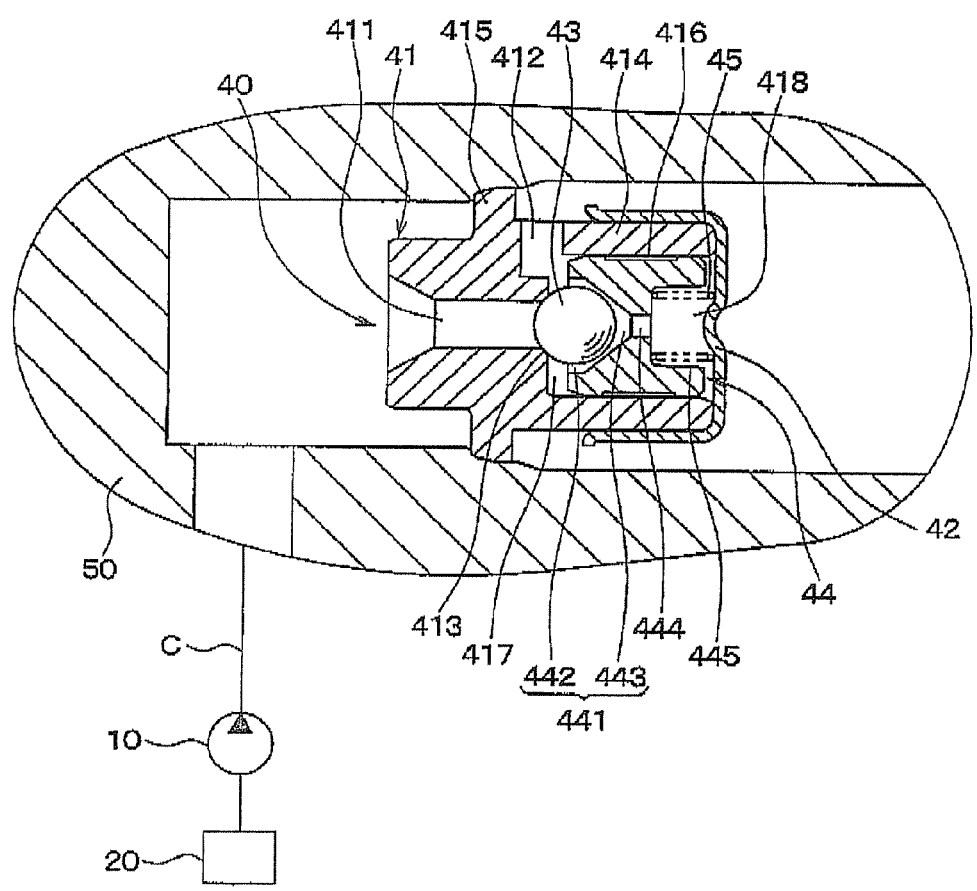
FIG. 4 shows a sectional view of the check valve of FIG. 1 in a failure state.

Next, the operation of the check valve 40 is explained based on FIG. 2, FIG. 3 and FIG. 4.

First, when the pump 10 is not driven, the valve part 43 and the piston part 44 move toward the valve seat 413 side by the energization force of the spring 45, as shown in FIG. 2, and the valve part 43 contacts to the valve seat 413 so that the check valve 40 is closed because energization force by pressure in the valve opening direction does not act on the valve part 43.

When the pump 10 is driven, the brake fluid discharged from the pump 10 flows into the entrance-side fluid passage 411 through the pipeline C, and the valve part is energized in the valve opening direction by the pressure of the brake fluid.

When the energization force in the valve opening direction by the pressure exceeds the energization force in a valve closing direction by the spring 45, as shown in FIG. 3, the valve part 43 and the piston part 44 move toward the anti-valve seat side so that the valve part 43 separates from the valve seat 413 and the check valve 40 is opened.

Since the valve part 43 is pressed on a conical surface of the valve part accommodating recess 441 by pressure at this time, the valve part 43 is held stably at the piston part 44, and the valve part 43 and the piston part 44 operate unitarily.

Further, by opening the check valve 40, brake fluid flows into the exit-side fluid passage 417 in the cylinder part and also to the through hole 412 from the entrance-side fluid passage 411, then flows into the outer surface side of the piston accommodation cylinder part 414, and flows into the downstream side of the check valve 40 of the pipeline C.

Here, in the case when the piston part 44 sticks within the piston accommodation pipe part 414 due to a foreign substance when the valve is opened, and when the pressure of the exit-side fluid passage 417 in the cylinder part (i.e., the brake fluid pressure generating means side) becomes higher than the pressure of the entrance-side fluid passage 411 (i.e., pump side) like the time of usual braking when pump is not operating, the pressure of the exit-side fluid passage 417 in the cylinder part is led to the anti-valve seat side accommodation space 443 through the gap between the piston part 44 and the piston accommodation pipe part 414, the damper chamber 418, the spring accommodating recess 445, and the piston part communicating hole 444.

Moreover, as shown in FIG. 4, since the pressure acts on the surface in the anti-valve seat side of the valve part 43, the valve part 43 moves to the valve seat 413 side by the pressure to close the valve, and this prevents the brake fluid from flowing backwards.

Therefore, even if the piston part 44 sticks when the valve is open, weakening of the brakes during regular braking can be avoided.

As mentioned above, in the present embodiment, when the pressure of the exit-side fluid passage 417 in the cylinder part becomes higher than the pressure of the entrance-side fluid passage 411 even if the piston part 44 sticks when the valve is open, weakening of the brakes during regular braking can be avoided since the valve part 43 moves to the valve seat 413 side and closes the valve.

Moreover, since the depth of the valve part accommodating recess 441 is configured so that the valve part 43 does not detach from the valve part accommodating recess 441 when the piston part 44 is positioned where most distant from the valve seat 413, the valve part 43 can always be held in the valve part accommodating recess 441 while maintaining that the valve part 43 is relatively movable to the piston part 44.

The Second Embodiment

The second embodiment of the present disclosure is explained. Hereinafter, only different parts from the first embodiment are explained.

Figure 5:
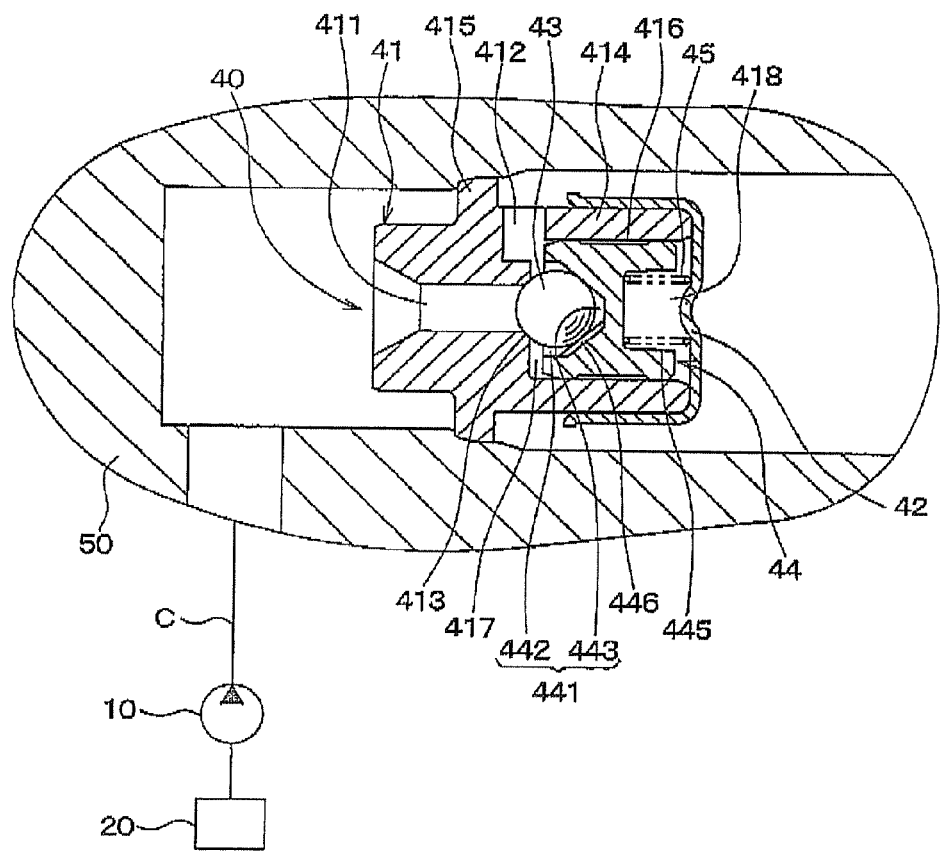
FIG. 5 shows a sectional view of the check valve in a second embodiment of the present disclosure.
Figure 6A:
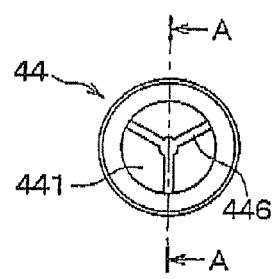
FIG. 6A shows a side view of the piston part alone in the check valve of FIG. 5.
Figure 6B:
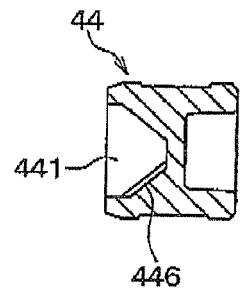
FIG. 6B shows a sectional view taken along a line A-A of FIG. 6A.

As shown in FIG. 5 and FIG. 6, the piston part communicating hole 444 is not provided for the piston part 44.

Moreover, the piston part communicating slots 446 that connect the valve seat side accommodation space 442 and the anti-valve seat side accommodation space 443 are formed in the conical wall surface of the valve part accommodating recess 441 of the piston part 44.

There are three piston part communicating slots 446 formed radiately.

The anti-valve seat side accommodation space 443 is communicated to the exit-side fluid passage 417 in the so cylinder part through the piston part communicating slots 446 and the valve seat side accommodation space 442.

In the present embodiment, when the piston part 44 sticks within the piston accommodation pipe part 414 due to a foreign substance when the valve is opened, and when the pressure of the exit-side fluid passage 417 in the cylinder part (i.e., the brake fluid pressure generating means side) becomes higher than the pressure of the entrance-side fluid passage 411 (i.e., the pump side) like the time of usual braking when pump is not operating, the pressure of the exit-side fluid passage 417 in the cylinder part is led to the anti-valve seat side accommodation space 443 through the valve seat side accommodation space 442 and the piston part communicating slots 446.

Moreover, since the pressure acts on the surface in the anti-valve seat side of the valve part 43, the valve part 43 moves to the valve seat 413 side by the pressure to close the valve, and this prevents the brake fluid from flowing backwards.

Therefore, even if the piston part 44 sticks when the valve is open, weakening of the brakes during regular braking can be avoided.

Other Embodiments

With each embodiment mentioned above, although the piston part 44 is made into a substantially cylindrical shape, the piston part 44 may be a substantially columnar shape without having the piston part communicating hole 444 or the spring accommodating recess 443.

Moreover, with each embodiment mentioned above, although the check valve of the present disclosure is applied to the braking system, the check valve of the present disclosure may be applicable to other uses.

Furthermore, combination is arbitrarily possible for each embodiment mentioned above in the range that can be performed.

What is claimed is:

1. A check valve comprising:
a case member having an entrance-side fluid passage where fluid flows in, an exit-side fluid passage where fluid flows out, and a valve seat disposed in a downstream end of the entrance-side fluid passage;
a pipeline disposed in a housing, the pipeline being separated into a downstream side pipeline of the check valve and an upstream side pipeline of the check valve by the case member;
a valve member that opens and closes a passage between the entrance-side fluid passage and the exit-side fluid passages by touching and separating from the valve seat, and is energized in a valve opening direction by a pressure of the fluid from the entrance-side fluid passage; and
a spring that energizes the valve member in a valve closing direction; wherein,
the check valve opens when the energization force in the valve opening direction due to the pressure exceeds the energization force in the valve closing direction due to the spring; wherein,
the valve member has a piston part that reciprocates, and a valve part that is disposed in the valve seat side and touches and separates to the valve seat;
the case member has a piston accommodation cylinder part that accommodates the piston part reciprocatably;
the piston part has a valve part accommodating recess that accommodates a part of the valve part;
the valve part is disposed in the valve part accommodating recess movably relative to the piston part, and is urged against a wall surface of the valve part accommodating recess by a pressure of the fluid from the entrance-side fluid passage;
among the valve part accommodating recess, an anti-valve seat side accommodation space formed between a surface in an anti-valve seat side of the valve part and a wall surface of the valve part accommodating recess communicates to the exit side fluid passage.
a damper chamber is formed by the valve member and the case member in an anti-valve seat side of the valve member, the damper chamber generates damping force;
the anti-valve seat side accommodation space communicates with the exit side fluid passage through a piston part communicating slot formed in the wall surface of the valve part accommodating recess;
the valve part accommodating recess has a tapered surface, and the valve part is contactable to the tapered surface,
the anti-valve seat side accommodation space is formed between the piston part and the valve part; and
the piston accommodation cylinder part is formed coaxially with the entrance-side fluid passage, and only a single through hole extending in a radial direction is formed in the piston accommodation cylinder part.

2. The check valve according to claim 1, wherein;
the depth of the valve part accommodating recess is configured so that the valve part does not detach from the valve part accommodating recess when the piston part is positioned where most distant from the valve seat.

* * * * *